(12) United States Patent
Jiang

(10) Patent No.: US 10,547,529 B2
(45) Date of Patent: Jan. 28, 2020

(54) AVAILABILITY COUNTING APPARATUS AND METHOD

(71) Applicant: Huawei Technologies Co., Ltd., Shenzhen (CN)

(72) Inventor: Xiaobin Jiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 15/871,324

(22) Filed: Jan. 15, 2018

(65) Prior Publication Data

US 2018/0139114 A1 May 17, 2018

Related U.S. Application Data

(63) Continuation of application No. PCT/CN2015/085611, filed on Jul. 30, 2015.

(51) Int. Cl.
*H04L 12/26* (2006.01)
*H04L 12/24* (2006.01)

(52) U.S. Cl.
CPC ...... *H04L 43/0811* (2013.01); *H04L 41/0681* (2013.01); *H04L 43/067* (2013.01)

(58) Field of Classification Search
CPC ..... H04L 41/00; H04L 41/06; H04L 41/0681; H04L 43/067; H04L 43/0811
See application file for complete search history.

(56) References Cited

U.S. PATENT DOCUMENTS

| 2015/0172070 A1* | 6/2015 | Csaszar | H04L 12/1863 370/218 |
| 2016/0224409 A1* | 8/2016 | Liu | H04L 67/10 |
| 2016/0232072 A1* | 8/2016 | Skerry | G06F 9/45533 |

(Continued)

FOREIGN PATENT DOCUMENTS

| CN | 101153830 A | 4/2008 |
| CN | 101477588 A | 7/2009 |
| CN | 101741595 A | 6/2010 |

(Continued)

OTHER PUBLICATIONS

Draft ETSI GS NFV-IFA 006 V0.4.2 (Jul. 2015), Network Function Virtualisation (NFV); Management and Orchestration; Vi-Vnfm Reference Point-Interface and Information Model Specification, 84 pages.

(Continued)

*Primary Examiner* — Joe Chacko
(74) *Attorney, Agent, or Firm* — Slater Matsil, LLP

(57) ABSTRACT

Embodiments of the present invention disclose an availability counting apparatus and method. The apparatus includes: a configuration module, configured to: receive an unavailability rule configured by a user, and subscribe to a detection item from a detection apparatus at each layer of network functions virtualization and notify the detection apparatus of a condition for triggering a fault alarm, according to the unavailability rule; a calculation module, configured to: receive fault alarm information and fault recovery information that are reported by the detection apparatus, and calculate availability of each layer of the network functions virtualization; and a report module, configured to output an availability counting report according to a preset period.

13 Claims, 9 Drawing Sheets

(56) References Cited

U.S. PATENT DOCUMENTS

2016/0315802 A1\* 10/2016 Wei .................. H04L 41/06
2017/0346676 A1\* 11/2017 Andrianov .......... H04L 41/0631

FOREIGN PATENT DOCUMENTS

| CN | 101741609 A | 6/2010 |
| --- | --- | --- |
| CN | 101964730 A | 2/2011 |
| CN | 104170323 A | 11/2014 |
| CN | 104468181 A | 3/2015 |
| EP | 3119034 A1 | 1/2017 |
| WO | 2015100611 A1 | 7/2015 |

OTHER PUBLICATIONS

ETSI GS NFV-REL 001 V1.1.1 (Jan. 2015), Network Functions Virtualisation (NFV); Resiliency Requirements, 82 pages.

ETSI GS REL 003 V0.2.0 (Jul. 2015), Reliability; Report on Models and Features for E2E Reliability, 40 pages.

Huawei, "Chapter 9. E2E Operation and Management of Service Availability and Reliability," NFVREL(15) 000073r2, Jul. 20, 2015, 6 pages.

KDDI Research Institute Co., Ltd. "Success in Application Automation Demonstration of SDN/NFV Generation Network", KDDI Laboratory News Release, KDDI Laboratory, May 26, 2015, total 6 pages. With English translation.

\* cited by examiner

CONT. CONT. CONT.    CONT.
FROM FROM FROM      FROM

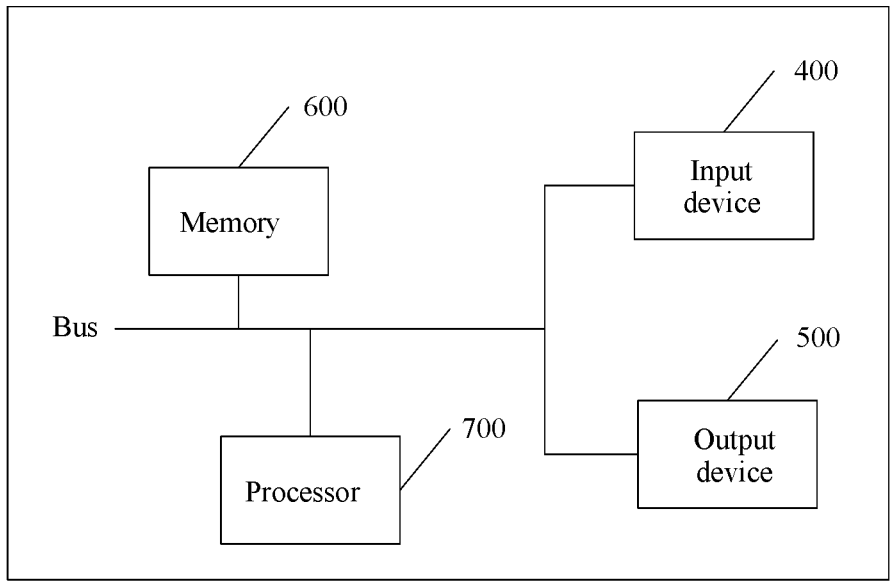

FIG. 5

| S601 |
|---|
| Receive an unavailability rule configured by a user, and subscribe to a detection item from a detection apparatus at each layer of network functions virtualization and notify the detection apparatus of a condition for triggering a fault alarm, according to the unavailability rule |

| S602 |
|---|
| Receive fault alarm information and fault recovery information that are reported by the detection apparatus, and calculate availability of each layer of the network functions virtualization |

| S603 |
|---|
| Output an availability counting report according to a preset period |

FIG. 6

AVAILABILITY COUNTING APPARATUS AND METHOD

CROSS-REFERENCE TO RELATED APPLICATIONS

This application is a continuation of International Application No. PCT/CN2015/085611, filed on Jul. 30, 2015, the disclosure of which is hereby incorporated by reference in its entirety.

TECHNICAL FIELD

Embodiments of the present invention relate to the field of communications technologies, and in particular, to an availability counting apparatus and method.

BACKGROUND

Network functions virtualization (NFV for short) is software processing for bearing many functions by using commodity hardware such as x86 and a virtualization technology, so as to reduce high device costs of a network. By means of software/hardware decoupling and function abstraction, a network device function no longer depends on special-purpose hardware, a resource can be fully and flexibly shared, a new service can be rapidly developed and deployed, and automatic deployment, auto scaling, fault isolation, self-healing, and the like are performed based on an actual service requirement. An NFV system is structured vertically and horizontally. According to an NFV design, there are three layers vertically: an infrastructure layer, a virtual network layer, and an operation support layer. There are two domains horizontally: a service network domain and a management and orchestration domain.

Because a telecommunications operator has a relatively high requirement on device reliability, generally, availability needs to reach five nines (that is, running interruption of a device is less than 5 minutes each year). In availability calculation, usually, an interruption time is manually and periodically counted, to determine whether a predetermined availability requirement is met. Specifically, availability may be calculated by using a system runtime and the interruption time. That is, Availability=(Runtime−Unavailable time)/Runtime. Because the runtime may be directly obtained by counting a time from a time point at which a device is powered on and starts running to a counting time point, a main issue is to count the unavailable time caused by a fault. In the prior art, during counting of the unavailable time, a third-party tool may be used to maintain a continuous connection, and whether a network is available is determined according to whether a service is available. The network is determined as unavailable when the third-party tool cannot connect to the network. This is often applied to an Internet network. Alternatively, when a fault occurs in the system, a maintenance engineer manually calculates an unavailable time of a service according to maintenance alarm information. This is often applied to a communications network. However, in the foregoing methods, only overall availability of a system (an Internet network or a communications device) is counted, and availability of different layers of a system, such as a network functions virtualization system, that includes a multilayer architecture cannot be determined.

SUMMARY

A technical problem to be resolved in embodiments of the present invention is to provide an availability counting apparatus and method, so that availability of layers of a network functions virtualization system can be counted separately.

To resolve the foregoing technical problem, in a first aspect, an embodiment of the present invention provides an availability counting apparatus. The apparatus includes a configuration module, configured to: receive an unavailability rule configured by a user, and subscribe to a detection item from a detection apparatus at each layer of network functions virtualization and notify the detection apparatus of a condition for triggering a fault alarm, according to the unavailability rule. The apparatus also includes a calculation module, configured to: receive fault alarm information and fault recovery information that are reported by the detection apparatus, and calculate availability of each layer of the network functions virtualization. The apparatus also includes a report module, configured to output an availability counting report according to a preset period.

With reference to an implementation of the first aspect, in a first possible implementation of the first aspect, the unavailability rule includes an availability indicator defined by the user, a detection item corresponding to the availability indicator, and an algorithm for counting the availability indicator, and the calculation module is specifically configured to calculate a result of the availability indicator according to the algorithm for counting the availability indicator.

With reference to the first aspect, or the first possible implementation of the first aspect, in a second possible implementation of the first aspect, the calculation module is further configured to compare detection results of detection items, and determine a location at which a fault occurs.

With reference to any one of the first aspect, or the first to the second possible implementations of the first aspect, in a third possible implementation of the first aspect, the calculation module is further configured to: receive detection results of all the detection items that are reported by the detection apparatus, and calculate availability of each device at each layer of the network functions virtualization.

With reference to any one of the first aspect, or the first to the third possible implementations of the first aspect, in a fourth possible implementation of the first aspect, the report module is further configured to identify a device with substandard availability.

With reference to any one of the first aspect, or the first to the fourth possible implementations of the first aspect, in a fifth possible implementation of the first aspect, the calculation module and the detection apparatus are disposed in an integrated manner.

With reference to any one of the first aspect, or the first to the fifth possible implementations of the first aspect, in a sixth possible implementation of the first aspect, the availability counting apparatus is integrated in an orchestrator of the network functions virtualization, or integrated at an operation support layer of the network functions virtualization, or disposed independently.

According to a second aspect, an embodiment of the present invention provides an availability counting apparatus. The apparatus also includes an input device, an output device, a memory, and a processor. The input device, the output device, the memory, and the processor are connected to a bus. The memory stores a set of program code. The processor is configured to invoke the program code stored in the memory to perform the following operations: receiving an unavailability rule configured by a user, and subscribing to a detection item from a detection apparatus at each layer of network functions virtualization and notifying the detection apparatus of a condition for triggering a fault alarm, according to the unavailability rule; receiving fault alarm information and fault recovery information that are reported by the detection apparatus, and calculating availability of each layer of the network functions virtualization; and outputting an availability counting report according to a preset period.

With reference to an implementation of the second aspect, in a first possible implementation of the second aspect, the unavailability rule includes an availability indicator defined by the user, a detection item corresponding to the availability indicator, and an algorithm for counting the availability indicator, and the processor is specifically configured to calculate a result of the availability indicator according to the algorithm for counting the availability indicator.

With reference to the second aspect, or the first possible implementation of the second aspect, in a second possible implementation of the second aspect, the processor is further configured to compare detection results of detection items, and determine a location at which a fault occurs.

With reference to any one of the second aspect, or the first to the second possible implementations of the second aspect, in a third possible implementation of the second aspect, the processor is further configured to: receive detection results of all the detection items that are reported by the detection apparatus, and calculate availability of each device at each layer of the network functions virtualization.

With reference to any one of the second aspect, or the first to the third possible implementations of the second aspect, in a fourth possible implementation of the second aspect, the processor is further configured to identify a device with substandard availability.

With reference to any one of the second aspect, or the first to the fourth possible implementations of the second aspect, in a fifth possible implementation of the second aspect, the availability counting apparatus is integrated in an orchestrator of the network functions virtualization, or integrated at an operation support layer of the network functions virtualization, or disposed independently.

According to a third aspect, an embodiment of the present invention provides an availability counting method. The method includes receiving an unavailability rule configured by a user, and subscribing to a detection item from a detection apparatus at each layer of network functions virtualization and notifying the detection apparatus of a condition for triggering a fault alarm, according to the unavailability rule. The method also includes receiving fault alarm information and fault recovery information that are reported by the detection apparatus, and calculating availability of each layer of the network functions virtualization; and outputting an availability counting report according to a preset period.

With reference to implementation of the third aspect, in a first possible implementation of the third aspect, the unavailability rule includes an availability indicator defined by the user, a detection item corresponding to the availability indicator, and an algorithm for counting the availability indicator; and the calculating availability of each layer of the network functions virtualization includes: calculating a result of the availability indicator according to the algorithm for counting the availability indicator.

With reference to the third aspect, or the first possible implementation of the third aspect, in a second possible implementation of the third aspect, before the calculating availability of each layer of the network functions virtualization, the method further includes: comparing detection results of detection items, and determining a location at which a fault occurs.

With reference to any one of the third aspect, or the first to the second possible implementations of the third aspect, in a third possible implementation of the third aspect, the method further includes: receiving detection results of all the detection items that are reported by the detection apparatus, and calculating availability of each device at each layer of the network functions virtualization.

With reference to any one of the third aspect, or the first to the third possible implementations of the third aspect, in a fourth possible implementation of the third aspect, during the outputting an availability counting report according to a preset period, the method further includes: identifying a device with substandard availability.

The following beneficial effects are achieved by implementing the embodiments of the present invention.

A configuration module receives an unavailability rule configured by a user, and notifies a detection apparatus at each layer of network functions virtualization of an item that needs to be detected and a condition for triggering a fault alarm, so that detection apparatuses at different layers can report fault alarm information and fault recovery information according to detection results. A calculation module may calculate availability of each layer by using the information, and finally, a report module periodically outputs an availability counting report. Counting can be performed on layers separately, and therefore, availability levels of different vendors that provide devices can be obtained and provided to a telecommunications operator as a basis for selecting a supplier, and may be used as a basis for determining whether a contract is up to standard.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 5 is a schematic diagram of composition of a second embodiment of an availability counting apparatus according to the present invention;

FIG. 6 is a schematic flowchart of a first embodiment of an availability counting method according to the present invention.

DETAILED DESCRIPTION OF ILLUSTRATIVE EMBODIMENTS

The following describes the technical solutions in embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1A:
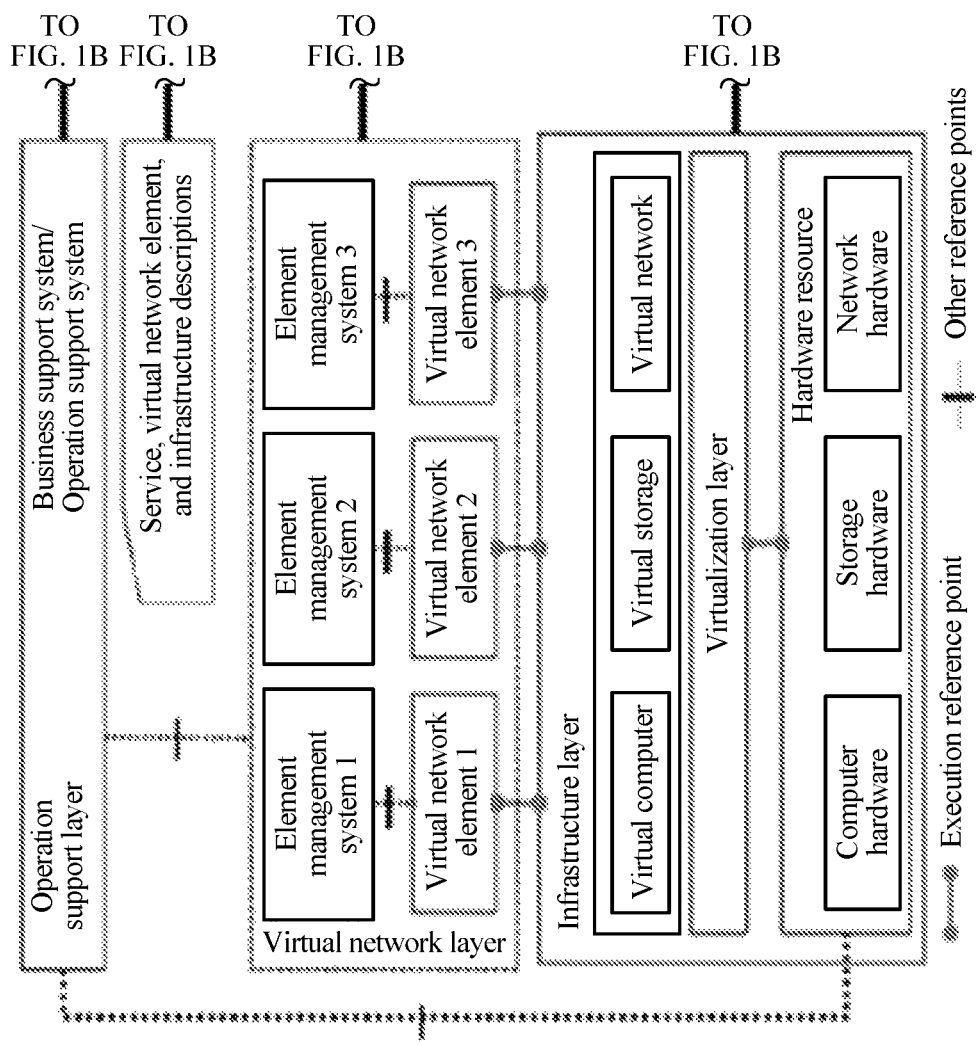
FIG. 1A and FIG. 1B are a schematic diagram of a reference architecture of an NFV system.
Figures 1A, 1B:
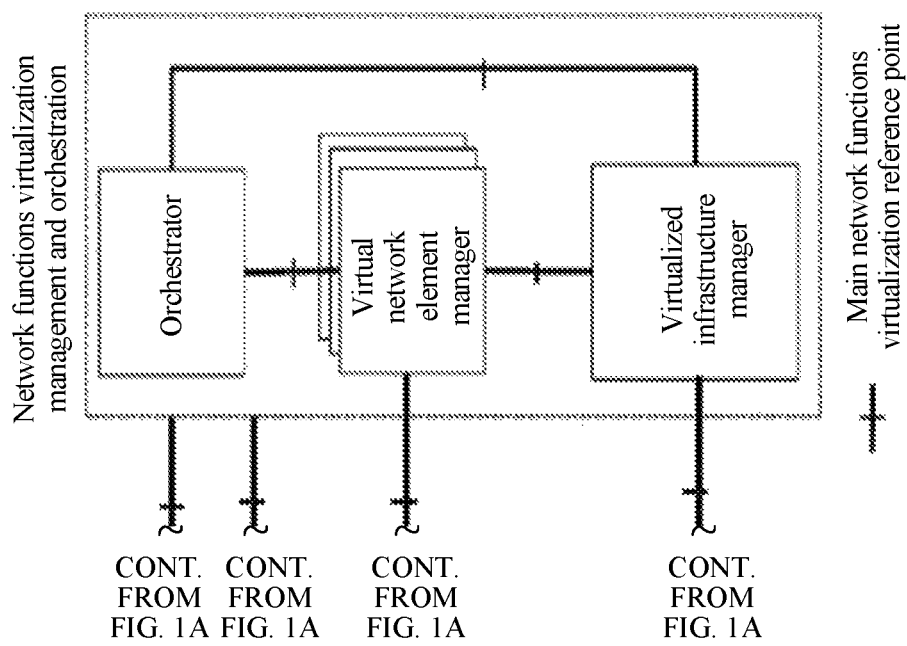

Referring to FIG. 1A and FIG. 1B, FIG. 1A and FIG. 1B are a schematic diagram of a reference architecture of an NFV system.

Compared with an existing network architecture (independent service network+operation support system), the NFV is deconstructed vertically and horizontally. According to an NFV design, the NFV is divided into three layers vertically.

Infrastructure layer (NFV Infrastructure, NFVI for short): The infrastructure layer is a resource pool from a perspective of cloud computing, and includes various hardware resources such as computer hardware, storage hardware, and network hardware, and a virtual computer, a virtual storage, and a virtual network that are virtualized by using a virtualization layer. When the NFVI is mapped to a physical infrastructure, the NFVI is multiple data centers that are dispersed geographically and that are connected by using a high-speed communications network. The NFVI needs to convert a physical computing/storage/exchange resource to a virtual computing/storage/exchange resource pool by means of virtualization.

Virtual network layer: The virtual network layer is corresponding to various existing telecommunications service networks. Each physical network element is mapped as a virtual network element (Virtual Network Feature, VNF for short). Resources required by the VNF need to be classified into virtual computing/storage/exchange resources, and are carried by the NFVI. A signaling interface (3GPP+ITU-T) defined in a conventional network is still used as an interface between VNFs. The VNF is managed by a corresponding element management system (EMS for short).

Operation support layer: The operation support layer is an existing operation support system (OSS for short)/business support system (BSS for short), and needs to make necessary modification and adjustment for virtualization.

The NFV is divided into two domains horizontally.

Service network domain: The service network domain is various existing telecommunications service networks.

Management and orchestration domain: A largest difference from a conventional network lies in that the management and orchestration (MANO for short) domain is added to the NFV. MANO is responsible for management and orchestration of an entire NFVI resource, is responsible for mapping and association between a service network and an NFVI resource, and is responsible for implementation of an OSS service resource process and the like. The MANO includes three entities internally: a virtualized resource manager (Virtualised Infrastructure Managers, VIM for short), a virtual network element manager (VNF Manager, VNFM for short), and an orchestrator that are respectively used to complete three layers of management on network services (NS for short) that are provided by an NFVI, a VNF, and the service network.

Different layers, different devices, or different managers may communicate by using a corresponding reference point.

Figure 2:
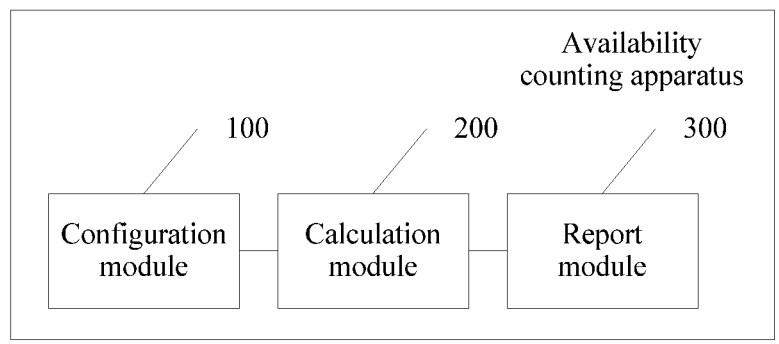
FIG. 2 is a schematic diagram of composition of a first embodiment of an availability counting apparatus according to the present invention.

Referring to FIG. 2, FIG. 2 is a schematic diagram of composition of a first embodiment of an availability counting apparatus according to the present invention. In this embodiment, the apparatus includes: a configuration module 100, configured to: receive an unavailability rule configured by a user, and subscribe to a detection item from a detection apparatus at each layer of network functions virtualization and notify the detection apparatus of a condition for triggering a fault alarm, according to the unavailability rule; a calculation module 200, configured to: receive fault alarm information and fault recovery information that are reported by the detection apparatus, and calculate availability of each layer of the network functions virtualization; and a report module 300, configured to output an availability counting report according to a preset period.

The detection apparatus is an existing apparatus at each layer of the network functions virtualization, and may perform customized configuration or standardized configuration on the detection item of the detection apparatus.

The unavailability rule configured by the user may include but is not limited to an unavailability rule for a service, a virtual machine, or hardware. The unavailability rule may be a rule used for determining an unavailable fault scope of a device or converting a fault impact scope. Certainly, in addition to being configured by the user, the unavailability rule may be configured by default by a vendor at delivery, or several configuration templates are provided to the user for selection.

Optionally, the unavailability rule includes an availability indicator defined by the user, a detection item corresponding to the availability indicator, and an algorithm for counting the availability indicator. The calculation module 200 is specifically configured to calculate a result of the availability indicator according to the algorithm for counting the availability indicator.

For example, for calculation of availability of an operation support layer, NS availability may be defined. Related detection items of the NS availability may include but are not limited to process unavailability, a processor fault ratio, a virtual network element fault ratio, and a virtual machine fault ratio. A counting algorithm corresponding to the NS availability may be a ratio of a sum of unavailable time of VNFs to a network run period. If the VNF is unavailable because of multiple factors in the detection item, during calculation of the NS availability, a sum of unavailable time of the VNF that is caused by any one of all detection items needs to be counted, that is, regardless of a triggering factor, only total duration of such a result of VNF unavailability needs to be counted. For example, if VNF unavailability of 5 minutes is caused because of the process unavailability, and VNF unavailability of 10 minutes is caused because of the processor fault ratio, total unavailable duration is 15 minutes. If VNF unavailability of 10 minutes is caused because of the process unavailability and the processor fault ratio, total unavailable duration is 10 minutes.

Similarly, layer-I availability may be defined for an infrastructure layer. A detection item may include but is not limited to a virtual resource error or an alarm light. A calculation formula of the layer-I availability may be a sum of all critical resource fault time divided by a product of a total resource quantity and a resource online period. In addition, hardware reliability may further be defined to calculate availability of a hardware resource, and the like. Details are not described herein. During availability calculation at each layer, availability of the entire layer may be determined by centralizing dispersed detection results of multiple detection items and availability of different devices.

The detection item may mainly include availability detection of the following main resources: a server, a virtual machine, a process, a virtual network element, or the like. When the detection apparatus detects unavailability information, occurrence frequency and recovery time that are of a device fault may be recorded and reported to a manager corresponding to each layer. The detection result may be reported by using an operation and maintenance interface.

Optionally, the calculation module 200 is further configured to: compare detection results of detection items, and determine a location at which a fault occurs.

Because faults in some devices may lead to unavailability of other devices, or faults at some layers may lead to faults at other layers, availability calculation accuracy may be improved by means of fault location analysis. For example, when a fault occurs in a hard disk in storage hardware, a basic service layer may give an alarm, affecting availability calculation. In this case, a fault may also be caused at a virtual network layer, affecting the availability calculation. In this case, comparison and analysis need to be performed according to a specific detection result, to determine a cause and a location of the fault, and availability calculation is performed after unwanted data is dropped.

Optionally, in addition to separately calculating availability of layers, availability of devices of a specific type or availability of a specific device may further be calculated in detail. The calculation module 200 is further configured to: receive detection results of all the detection items that are reported by the detection apparatus, and calculate availability of each device at each layer of the network functions virtualization, to facilitate rapid device replacement and maintenance.

Optionally, during generation of the report, the report module 300 may list only a layer or a device with unqualified availability, or may list all layers or devices, and the report module is further configured to identify a device with substandard availability. To facilitate viewing all detection data and availability data by the user, the substandard device is removed or replaced, a device that is close to a substandardization edge may be replaced, or use of a device with low availability may be avoided as much as possible during resource allocation, so as to improve availability of an entire system and meet requirements of the user for spare part replacement evaluation, contract satisfaction evaluation, purchase decision, and the like.

It should be noted that the configuration module 100, the calculation module 200, and the report module 300 may exist independently, or may be disposed in an integrated manner. In this embodiment, the configuration module 100, the calculation module 200, or the report module 300 may be disposed independently and independent of a processor of the availability counting apparatus in a form of hardware, and may be disposed in a form of a microprocessor, or may be built in a processor of the apparatus in a form of hardware, or may be built in a memory of the apparatus in a form of software, so that the processor of the apparatus invokes and performs an operation corresponding to the configuration module 100, the calculation module 200, or the report module 300.

For example, in this embodiment (the embodiment shown in FIG. 2) of the availability counting apparatus according to the present invention, the calculation module 200 may be the processor of the availability counting apparatus, and functions of the configuration module 100 and the report module 300 may be built in the processor, or may be independent of the processor and disposed independently, or may be stored in the memory in a form of software. The processor invokes and implements the functions of the configuration module 100 and the report module 300. This embodiment of the present invention sets no limitation. The foregoing processor may be a central processing unit (CPU), a microprocessor, a single-chip microcomputer, or the like.

Certainly, in addition to integrated configuration of the three modules, the calculation module 200 and the detection apparatus may be disposed in an integrated manner. Therefore, item detection and availability calculation are unified, and a detection apparatus and a calculation module are disposed each time, so that distributed configuration is implemented.

A configuration module receives an unavailability rule configured by a user, and notifies a detection apparatus at each layer of network functions virtualization of an item that needs to be detected and a condition for triggering a fault alarm, so that detection apparatuses at different layers can report fault alarm information and fault recovery information according to detection results. A calculation module may calculate availability of each layer by using the information, and finally, a report module periodically outputs an availability counting report. Counting can be performed on layers separately, and therefore, availability levels of different vendors that provide devices can be obtained and provided to a telecommunications operator as a basis for selecting a supplier, and may be used as a basis for determining whether a contract is up to standard. In addition, when a fault or unavailability occurs in a system including different supplier devices, information and data that are provided by this apparatus may be used to help with responsibility definition. Further, use of a device with relatively low availability that is learned after the counting may be avoided as much as possible during resource allocation, so that availability of an entire system is improved.

In addition, the availability counting apparatus described in this embodiment of the present invention may be integrated in an orchestrator of the network functions virtualization, or integrated at an operation support layer of the network functions virtualization, or disposed independently. The present invention sets no limitation. Configuration of the availability counting apparatus in this embodiment of the present invention is described as an example below with reference to FIG. 3A and FIG. 3B and FIG. 4A and FIG. 4B.

Figure 3A:
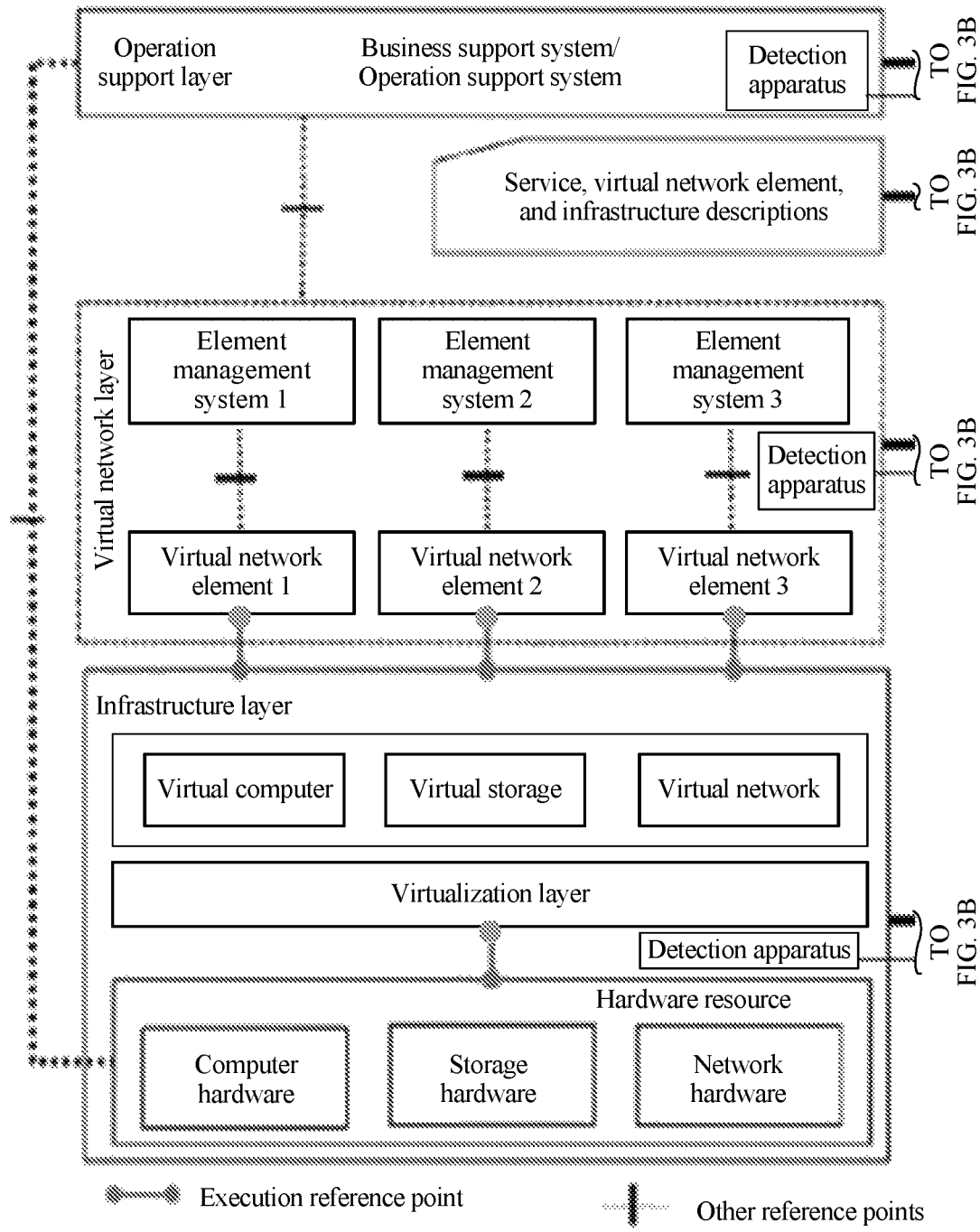
FIG. 3A and FIG. 3B are a schematic diagram of an architecture of a first embodiment of an NFV system to which an availability counting apparatus is applied according to the present invention.
Figure 3B:
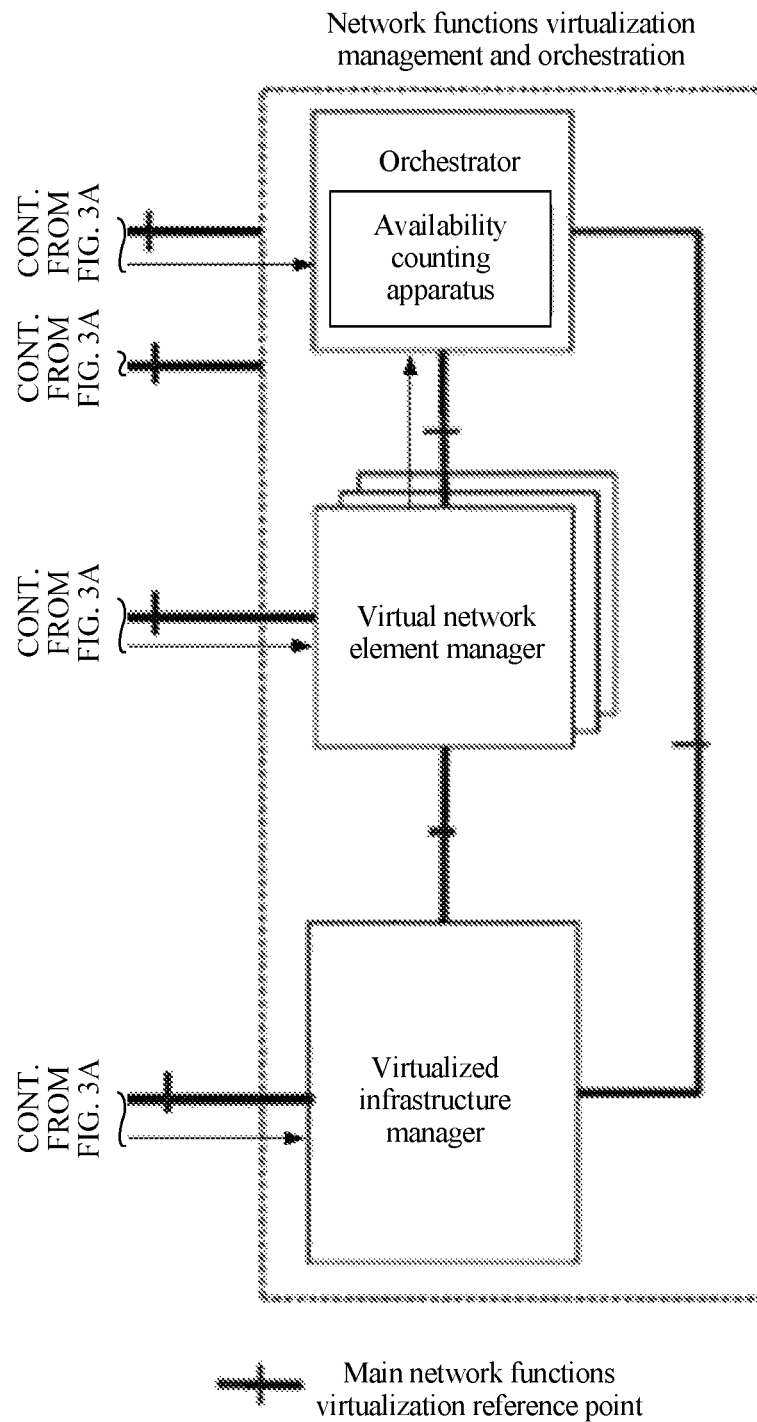

Referring to FIG. 3A and FIG. 3B, FIG. 3A and FIG. 3B are a schematic diagram of an architecture of a first embodiment of an NFV system to which an availability counting apparatus is applied according to the present invention. In this embodiment, for architecture composition of the NFV, refer to related descriptions of FIG. 1A and FIG. 1B. Details are not described herein again.

The availability counting apparatus is integrated in an orchestrator in a management and orchestration domain. After detecting results, detection apparatuses at an infrastructure layer, a virtual network layer, and an operation support layer may respectively transmit the results to respective corresponding managers, and then the managers send the results to the availability counting apparatus in the orchestrator for calculation and report outputting.

Specifically, a detection apparatus at each layer may be configured by using an existing fault detection module, and a detection item may be customized by a user. Specific data transmission channels may be as follows: VNF-VNFM-Orchestrator in which transmitted data may be VNF software fault alarm information or fault recovery information; NFVI-VIM-Orchestrator in which transmitted data may be virtual resource fault alarm information or fault recovery information; and NFVI-VIM-Orchestrator in which transmitted data may be hardware on-line information or hardware fault alarm information.

Figure 4A:
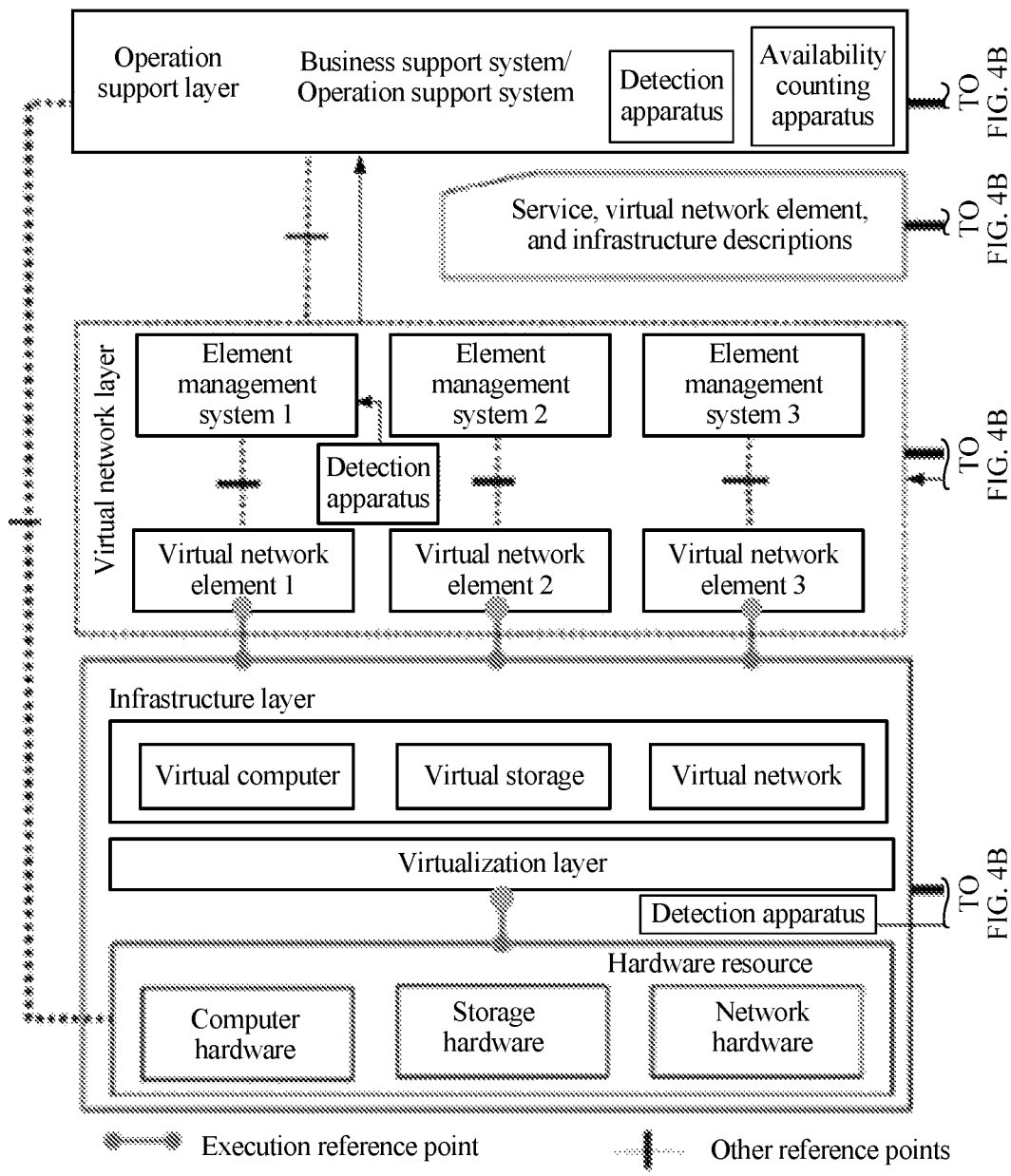
FIG. 4A and FIG. 4B are a schematic diagram of an architecture of a second embodiment of an NFV system to which an availability counting apparatus is applied according to the present invention.
Figure 4B:
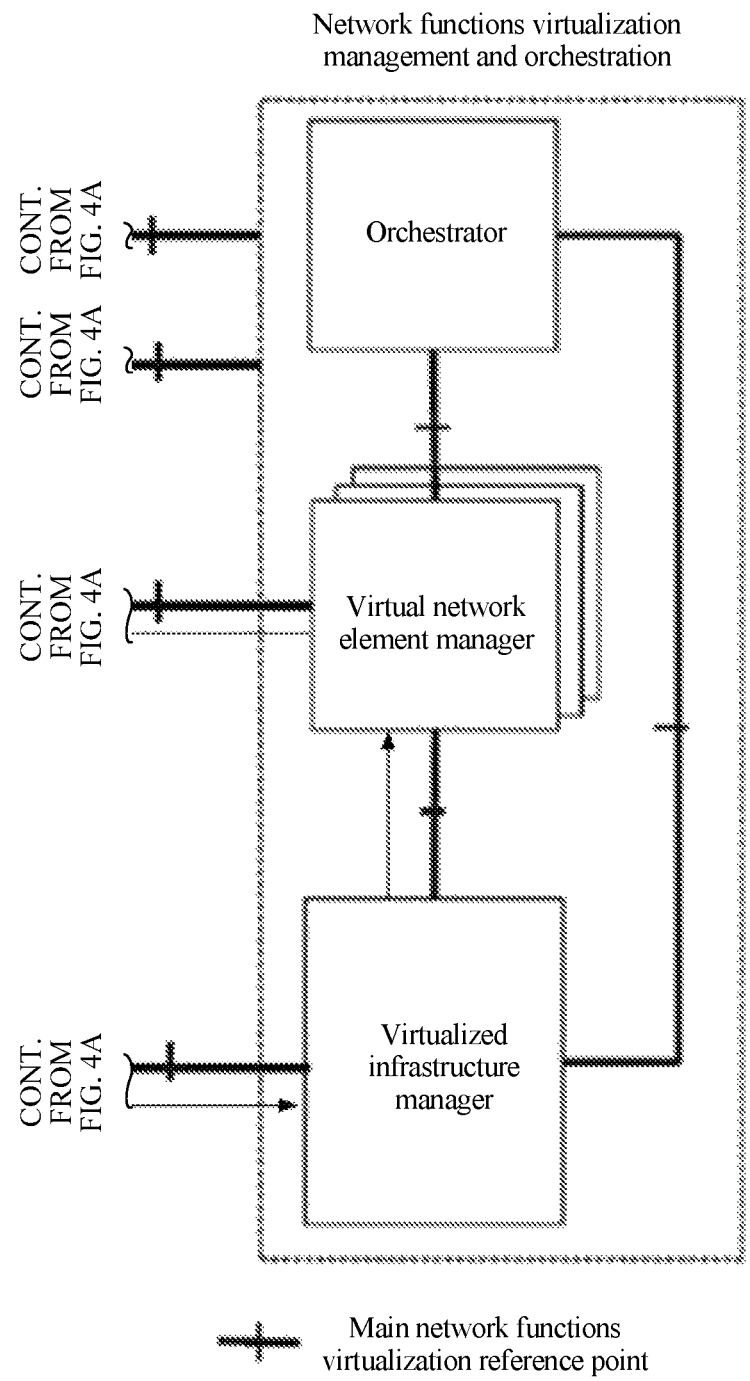

For a specific architecture of an operation support layer of the network functions virtualization at which the apparatus is integrated, refer to FIG. 4A and FIG. 4B. FIG. 4A and FIG. 4B are a schematic diagram of an architecture of a second embodiment of an NFV system to which an availability counting apparatus is applied according to the present invention. In this embodiment, the availability counting apparatus includes the following content.

The availability counting apparatus is integrated at an operation support layer of network functions virtualization. After detecting a result, a detection apparatus at an infrastructure layer may transmit the result to a corresponding manager VIM, then the VIM sends the result to a VNFM, and then the VNFM sends the result to a network element manager system at a virtual network layer, and finally, the network element manager system sends the result to the availability counting apparatus at the operation support layer for calculation and report outputting. A result detected by a detection apparatus at the virtual network layer may be transmitted to the network element manager system, and may finally be sent by the network element manager system to the availability counting apparatus at the operation support layer for calculation and report outputting. A detection result of an operation management layer may be directly sent to the availability counting apparatus for calculation and report outputting.

Specifically, a detection apparatus at each layer may be configured by using an existing fault detection module, and a detection item may be customized by a user. Specific data transmission channels may be as follows: VNF-EMS-OSS in which transmitted data may be VNF software fault alarm information or fault recovery information; NFVI-VIM-VNFM-EMS-OSS in which transmitted data may be virtual resource fault alarm information or fault recovery information; and NFVI-VIM-VNFM-EMS-OSS in which transmitted data may be hardware on-line information or hardware fault alarm information.

Certainly, in addition to the foregoing implementation solution of integrated disposing, an independent apparatus may be configured, and the apparatus communicates with and transmits data to each layer and two domains of the network functions virtualization by using an existing interface.

Referring to FIG. 5, FIG. 5 is a schematic diagram of composition of a second embodiment of an availability counting apparatus according to the present invention. In this embodiment, the apparatus includes: an input device 400, an output device 500, a memory 600, and a processor 700. The input device 400, the output device 500, the memory 600, and the processor 700 are connected to a bus, the memory 600 stores a set of program code, and the processor 700 is configured to invoke the program code stored in the memory 600 to perform the following operations: receiving an unavailability rule configured by a user, and subscribing to a detection item from a detection apparatus at each layer of network functions virtualization and notifying the detection apparatus of a condition for triggering a fault alarm, according to the unavailability rule; receiving fault alarm information and fault recovery information that are reported by the detection apparatus, and calculating availability of each layer of the network functions virtualization; and outputting an availability counting report according to a preset period.

Optionally, the unavailability rule includes an availability indicator defined by the user, a detection item corresponding to the availability indicator, and an algorithm for counting the availability indicator. The processor 700 is specifically configured to calculate a result of the availability indicator according to the algorithm for counting the availability indicator.

Optionally, the processor 700 is further configured to compare detection results of detection items, and determine a location at which a fault occurs.

Optionally, the processor 700 is further configured to: receive detection results of all the detection items that are reported by the detection apparatus, and calculate availability of each device at each layer of the network functions virtualization.

Optionally, the processor 700 is further configured to identify a device with substandard availability.

Optionally, the availability counting apparatus is integrated in an orchestrator of the network functions virtualization, or integrated at an operation support layer of the network functions virtualization, or disposed independently.

It should be noted that the processor 700 herein may be one processor or may be a collective term for multiple processing elements. For example, the processor may be a central processing unit (CPU for short), or may be an application specific integrated circuit (ASIC for short), or may be one or more integrated circuits configured to implement this embodiment of the present invention, for example, one or more microprocessors (digital signal processor, DSP for short), or one or more field programmable gate arrays (FPGA for short).

The memory 600 may be a storage apparatus, or may be a collective term for multiple storage elements, and is configured to store executable program code, or a parameter and data that are required for running the availability counting apparatus. In addition, the memory 600 may include a random access memory (RAM), and may further include a non-volatile memory, for example, a disk memory and a flash memory.

The bus may be an industry standard architecture (ISA for short) bus, a peripheral component interconnect (PCI for short) bus, an extended industry standard architecture (EISA for short) bus, or the like. The bus may be classified into an address bus, a data bus, a control bus, and the like. For ease of representation, only one thick line is used in FIG. 5 for representation, but it does not indicate that there is only one bus or one type of bus.

The input apparatus 400 and the output apparatus 500 are connected to the bus, so as to be connected to the processor 700 and other parts by using the bus. The input apparatus 400 may provide an input interface for an operator, so that the operator selects a control item by using the input interface, and configures the unavailability rule, and the like. In addition, the output apparatus 500 may further provide an output interface to display the availability counting report to the operator.

Referring to FIG. 6, FIG. 6 is a schematic flowchart of a first embodiment of an availability counting method according to the present invention, and in this embodiment, the method includes the following steps.

S601. Receive an unavailability rule configured by a user, and subscribe to a detection item from a detection apparatus at each layer of network functions virtualization and notify the detection apparatus of a condition for triggering a fault alarm, according to the unavailability rule.

Optionally, the unavailability rule includes an availability indicator defined by the user, a detection item corresponding to the availability indicator, and an algorithm for counting the availability indicator.

S602. Receive fault alarm information and fault recovery information that are reported by the detection apparatus, and calculate availability of each layer of the network functions virtualization.

The calculating availability of each layer of the network functions virtualization includes: calculating a result of the availability indicator according to the algorithm for counting the availability indicator.

S603. Output an availability counting report according to a preset period.

In this embodiment, availability of each layer of an NFV system may be obtained by separately calculating availability of the layers.

Figure 7:
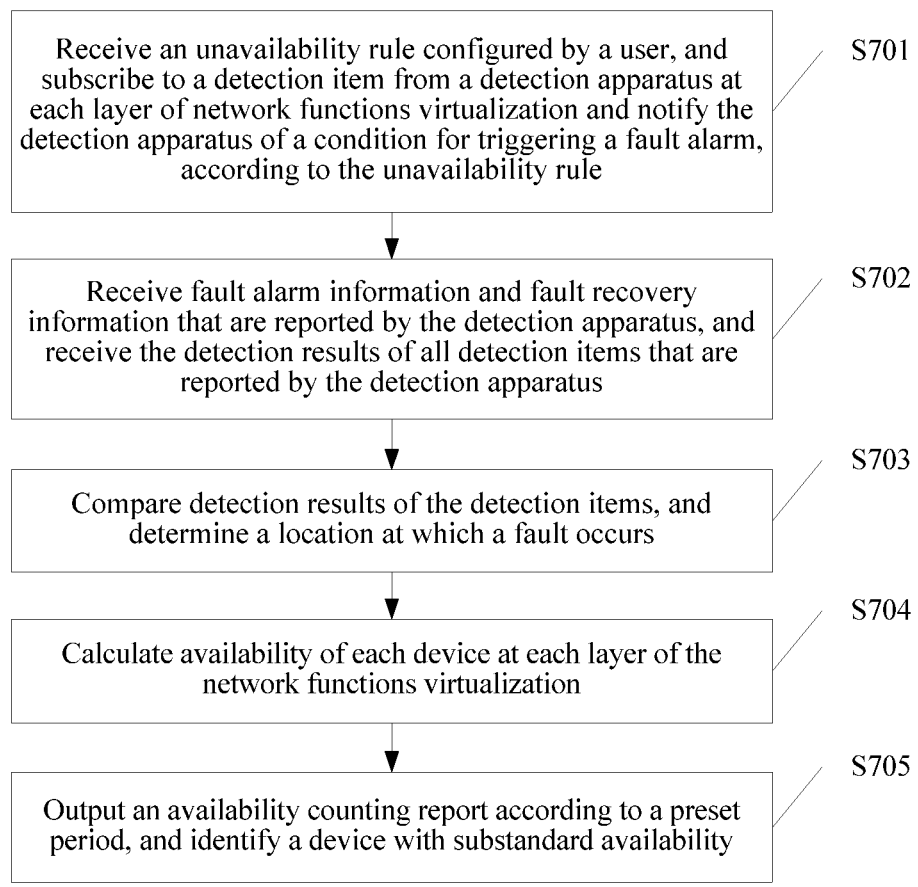
FIG. 7 is a schematic flowchart of a second embodiment of an availability counting method according to the present invention.

Referring to FIG. 7, FIG. 7 is a schematic flowchart of a second embodiment of an availability counting method according to the present invention, and in this embodiment, the method includes the following steps.

S701. Receive an unavailability rule configured by a user, and subscribe to a detection item from a detection apparatus at each layer of network functions virtualization and notify the detection apparatus of a condition for triggering a fault alarm, according to the unavailability rule.

S702. Receive fault alarm information and fault recovery information that are reported by the detection apparatus, and receive detection results of all detection items that are reported by the detection apparatus.

S703. Compare detection results of the detection items, and determine a location at which a fault occurs.

S704. Calculate availability of each device at each layer of the network functions virtualization.

S705. Output an availability counting report according to a preset period and identify a device with substandard availability.

In this embodiment, a more detailed availability calculation manner is used, so that availability of each device at each layer of an NFV system can be obtained, and the availability is marked when an availability report is output, to facilitate avoiding and rapid maintenance during resource allocation.

It should be noted that the embodiments in this specification are all described in a progressive manner, and each embodiment focuses on a difference from other embodiments. For same or similar parts in the embodiments, mutual reference may be made to these embodiments. Apparatus embodiments are basically similar to method embodiments, and therefore descriptions are relatively brief. For related parts, refer to the descriptions in the method embodiments.

According to the description of the foregoing embodiments, the present invention has the following advantages.

A configuration module receives an unavailability rule configured by a user, and notifies a detection apparatus at each layer of network functions virtualization of an item that needs to be detected and a condition for triggering a fault alarm, so that detection apparatuses at different layers can report fault alarm information and fault recovery information according to detection results. A calculation module may calculate availability of each layer by using the information, and finally, a report module periodically outputs an availability counting report. Counting can be performed on layers separately, and therefore, availability levels of different vendors that provide devices can be obtained and provided to a telecommunications operator as a basis for selecting a supplier, and may be used as a basis for determining whether a contract is up to standard. In addition, when a fault and unavailability occur in a system including different supplier devices, information and data that are provided by this apparatus may be used to help with responsibility definition. Further, use of a device with relatively low availability that is learned after the counting may be avoided as much as possible during resource allocation, so that availability of an entire system is improved.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The availability counting apparatus and method provided in the embodiments of the present invention are described in detail above. In this specification, specific examples are used to describe the principle and the implementations of the present invention, and the description of the embodiments is only intended to help understand the method and core idea of the present invention. In addition, persons of ordinary skill in the art can make modifications to specific implementations and application scopes according to the idea of the present invention. In conclusion, the content of this specification shall not be understood as a limitation on the present invention.

What is claimed is:

1. An apparatus, comprising:
    an input device;
    an output device;
    a non-transitory memory; and
    a processor, wherein the input device, the output device, the memory, and the processor are connected to a bus, the memory stores a set of program code, and the processor is configured to invoke the program code stored in the memory to:
    receive an unavailability rule configured by a user, subscribe to a detection item from a detection apparatus at each layer of network functions virtualization, and notify the detection apparatus of a condition for triggering a fault alarm, wherein the unavailability rule is received and the detection apparatus is notified according to the unavailability rule;
    receive fault alarm information and fault recovery information that are reported by the detection apparatus, and calculate availability of each layer of the network functions virtualization; and
    output an availability counting report according to a preset period.

2. The apparatus according to claim 1, wherein the unavailability rule comprises an availability indicator defined by the user, a detection item corresponding to the availability indicator, and an algorithm for counting the availability indicator, and the processor is configured to calculate a result of the availability indicator according to the algorithm for counting the availability indicator.

3. The apparatus according to claim 1, wherein the processor is further configured to compare detection results of detection items, and determine a location at which a fault occurs.

4. The apparatus according to claim 1, wherein the processor is further configured to:
    receive detection results of all the detection items and that are reported by the detection apparatus, and calculate availability of each device at each layer of the network functions virtualization.

5. The apparatus according to claim 1, wherein the processor is further configured to identify a device with substandard availability.

6. The apparatus according to claim 1, wherein the availability counting apparatus is integrated in an orchestrator of the network functions virtualization.

7. The apparatus according to claim 1, wherein the availability counting apparatus is integrated at an operation support layer of the network functions virtualization.

8. The apparatus according to claim 1, wherein the availability counting apparatus is disposed independently.

9. A method, comprising:
receiving an unavailability rule configured by a user, subscribing to a detection item from a detection apparatus at each layer of network functions virtualization, and notifying the detection apparatus of a condition for triggering a fault alarm, wherein the unavailability rule is received and the detection apparatus is notified according to the unavailability rule;
receiving fault alarm information and fault recovery information that are reported by the detection apparatus, and calculating availability of each layer of the network functions virtualization; and
outputting an availability counting report according to a preset period.

10. The method according to claim 9, wherein the unavailability rule comprises an availability indicator defined by the user, a detection item corresponding to the availability indicator, and an algorithm for counting the availability indicator; and
wherein calculating the availability of each layer of the network functions virtualization comprises calculating a result of the availability indicator according to the algorithm for counting the availability indicator.

11. The method according to claim 9, wherein before calculating the availability of each layer of the network functions virtualization, the method further comprises:
comparing detection results of detection items, and determining a location at which a fault occurs.

12. The method according to claim 9, further comprising:
receiving detection results of all the detection items that are reported by the detection apparatus, and calculating availability of each device at each layer of the network functions virtualization.

13. The method according to claim 9, wherein during outputting the availability counting report according to the preset period, the method further comprises:
identifying a device with substandard availability.

* * * * *